J. M. ZENTZ.
COMBINED CULTIVATOR AND WEED CUTTER.
APPLICATION FILED JULY 7, 1913.
1,112,046.
Patented Sept. 29, 1914.
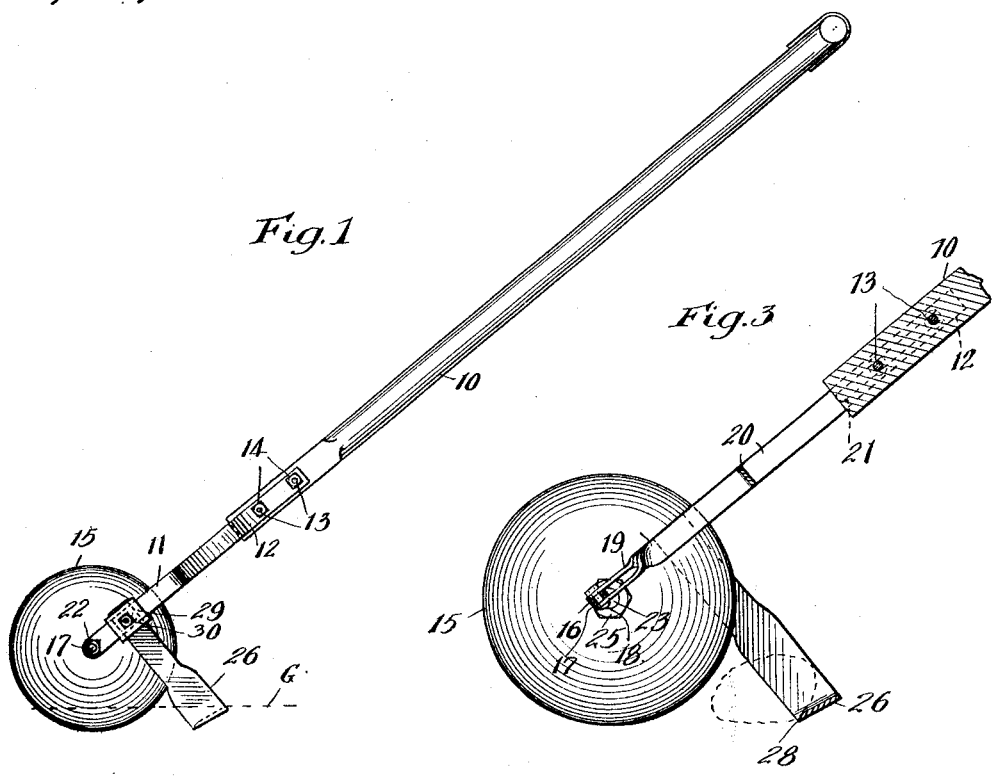
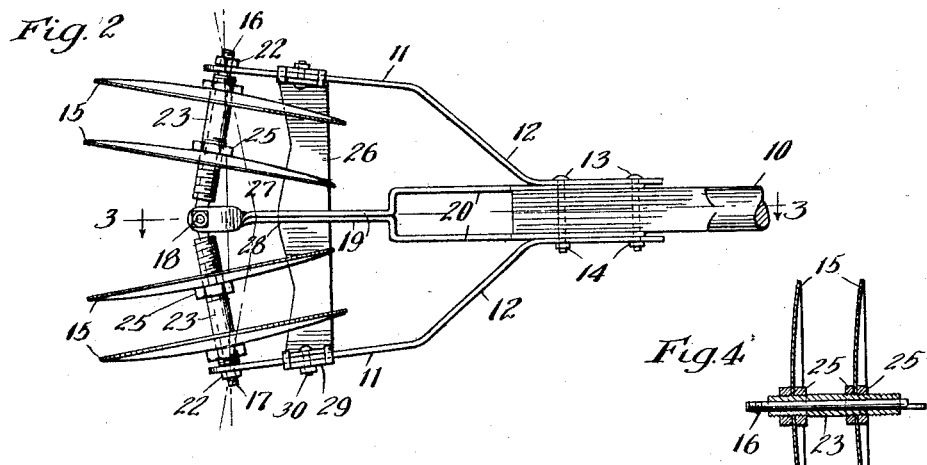
Witnesses:
Wm. Geiger
Esther Abrams
Inventor:
John M. Zentz
By Munday, Evarts, Adcock & Clarke
Attys.

UNITED STATES PATENT OFFICE.

JOHN M. ZENTZ, OF DAVID CITY, NEBRASKA, ASSIGNOR OF ONE-HALF TO SIMON F. LEONARD.

COMBINED CULTIVATOR AND WEED-CUTTER.

1,112,046.   Specification of Letters Patent.   Patented Sept. 29, 1914.

Application filed July 7, 1913. Serial No. 777,619.

*To all whom it may concern:*

Be it known that I, JOHN M. ZENTZ, a citizen of the United States, residing in David City, in the county of Butler and State of Nebraska, have invented a new and useful Improvement in Combined Cultivators and Weed-Cutters, of which the following is a specification.

This invention relates to improvements in a combined cultivator and weed cutter.

One object of the invention is to provide a hand cultivator provided with a weed cutting blade which is adapted for tilling all kinds of soil and is especially adapted for tilling rocky or gravelly soil.

Another object of the invention is to provide a cultivator having a weed cutting blade, the latter being so arranged and located that its depth under the top of the soil may be varied at will.

Other objects of the invention are to provide a combined hand cultivator and weed cutter employing cultivator disks; novel means for adjusting the position of the cultivator disks; and a novel, efficient form of cutting blade.

The invention furthermore consists in the improvements in the parts and devices and in the novel combinations of the parts and devices as herein shown, described or claimed.

In the drawings forming a part of this specification, Figure 1 is a side elevation of a combined cultivator and weed cutter embodying my improvements. Fig. 2 is an enlarged top plan view of the structure illustrated in Fig. 1 and showing in dotted lines different positions of the cultivator disk shafts. Fig. 3 is a longitudinal sectional view taken substantially on the line 3—3 of Fig. 2 and illustrating in dotted lines a relatively large stone as passing between the disks and the weed cutting blade; and Fig. 4 is a detail sectional view taken through the axis of one of the sets of cultivator disks.

In said drawing 10 denotes the handle of a hand-operated cultivator and weed cutter, said handle having secured thereto at the bottom a supporting frame for the cultivator disks, said frame comprising two members 11, having the rearwardly extending and inwardly bent portions 12 secured to the handle by means of bolts and nuts 13 and 14. Mounted in the outer ends of the members forming frame 11 is an adjustable, flexible supporting shaft for the cultivator disks 15, said shaft comprising two members 16 and 17 pivotally united by a bolt 18, the latter also passing through perforations in the outer end of an adjusting member 19, the latter having separated, rearwardly extending arms 20 on opposite sides of the lower end of the handle 10, said arms being confined between the handle 10 and the members 12 of the frame and slidable and adjustable on the lower end of the handle, said adjustment being possible through slots 21 cut in members 20, which allow the latter to slide up and down on the bolts 13, it being understood that when the disk shaft is to be adjusted, the nuts 14 will be loosened and the member 19 properly adjusted. The members 16 and 17 are threaded at their outer ends and are held in place by nuts 22. Mounted on the shaft members 16 and 17 are hollow, exteriorily threaded sleeves 23 to which are rigidly secured the concavo-convex cultivator disks 15, the latter being held in place by lock nuts 25. When the flexible shaft is adjusted, the ends thereof will slide in the bearings in the members 11, it being understood that the sleeves 23 are shorter than the distance between the pivot bolt 18 and the arms 11.

Secured to the frame 11, considerably to the rear of the disks 15, is a depending weed cutting blade 26, the latter, as shown, having a forward cutting edge 27, which is beveled in plan view to thereby provide a point 28 at the center. With this construction the point 28 will more easily catch or dig into the ground and the beveled edges of the blade will cause a more efficient cutting of the weeds, since it will cut the weeds with a shearing or drawing action better than is possible with a straight edge. The blade 26 is rigidly secured to the frame 11 by means of lock plates 29 and nuts and bolts 30.

As clearly shown in the drawing, the blade 26 will be at an angle to the horizontal when the cultivator and cutter is used and will serve to pull the blade down into the ground, and by moving the handle 10 up and down, the depth at which the cutter 26 will travel below the ground level G, shown in dotted lines in Fig. 1, can be varied as desired. As previously described, the weed cutting blade 26 is placed a considerable distance away from the disks 15, thereby permitting relatively large stones, pieces of wood and other substances, as shown in Fig. 3; to pass between the disks and the blade and thereby avoid choking up the devices and injury of the parts. The adjustment of the disk supporting shaft is provided in order to adapt the cultivator for throwing the dirt either inward or outward, and in this connection it will also be observed that the position of the disks may be changed by removing the sleeves 23 from the members 16 and 17 and reversing the same thereon. It will also be understood, that, if desired, the cultivator disks may be used without the blade 26 by tipping the device over, thereby bringing the blade above the disks and rendering it inoperative. With applicant's arrangement, the operator always exerts a downward pressure on the disks which causes the blade 26 to enter the ground and the latter in turn pulls the disk into the ground. No weights are required and the tool is easily guided since the operator can always see where he is pushing the tool.

Although I have herein shown and described what I now consider the preferred embodiment of my invention, yet it will be understood that various changes and modifications may be made without departing from the spirit of the invention, and all such changes and modifications are contemplated as come within the scope of the claims appended hereto.

I claim:

1. A combined hand cultivator and weed cutter including, in combination: a frame; a handle extending rearwardly and upwardly from the frame and by which the tool is adapted to be pushed; concavo-convex disks rotatably supported in said frame; and a depending, flat cutter blade at the rear of said disks and sufficiently far back to permit relatively large stones and the like to freely pass between it and the disks, said blade being arranged so that it is inclined from the vertical when the tool is being used, whereby it pulls and maintains the disks in the ground due to the downward pressure exerted on said handle, substantially as specified.

2. A device of the character described including, in combination: a forked frame having an operating handle secured thereto; a flexible shaft mounted on said frame and adjustable angularly; and a plurality of cultivator disks reversibly supported by said shaft, whereby the operation of the disks to throw the dirt inwardly or outwardly may be changed by adjusting the angularity of the shaft and reversing the position of said disks, substantially as specified.

3. A device of the character described including, in combination: a forked frame having an operating handle secured thereto; a flexible shaft having its ends mounted in the forks of said frame and adjustable angularly; and removable and interchangeable sleeves loosely mounted on the parts of said shaft, each of said sleeves carrying a plurality of cultivator disks whereby the operation of the disks to throw the dirt inwardly or outwardly may be changed by adjusting the angularity of the shaft and by interchanging said sleeves with the disks carried thereby, substantially as specified.

4. A device of the character described including, in combination: a forked frame having an operating handle secured thereto; a flexible shaft mounted on said frame and adjustable angularly; a plurality of cultivator disks reversibly supported by said shaft, whereby the operation of the disks to throw the dirt inwardly or outwardly may be changed by adjusting the angularity of the shaft and reversing the position of said disks; and a sub-soil cutter operating at the rear of said disks, substantially as specified.

JOHN M. ZENTZ.

Witnesses:
 JNO. D. SPRAGUE,
 JOSEPH HARRIS.